US011431766B2

(12) United States Patent
Reynolds et al.

(10) Patent No.: US 11,431,766 B2
(45) Date of Patent: Aug. 30, 2022

(54) SETTING TIMERS BASED ON PROCESSING OF GROUP COMMUNICATIONS USING NATURAL LANGUAGE PROCESSING

(71) Applicant: International Business Machines Corporation, Armonk, NY (US)

(72) Inventors: Spencer Thomas Reynolds, Austin, TX (US); Zachary A. Silverstein, Austin, TX (US); Jacob Ryan Jepperson, St. Paul, MN (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 17/141,218

(22) Filed: Jan. 4, 2021

(65) Prior Publication Data

US 2022/0217187 A1 Jul. 7, 2022

(51) Int. Cl.
*G06F 15/16* (2006.01)
*H04L 65/1093* (2022.01)
(Continued)

(52) U.S. Cl.
CPC .......... *H04L 65/1093* (2013.01); *G06F 40/40* (2020.01); *G10L 15/22* (2013.01);
(Continued)

(58) Field of Classification Search
CPC ... H04L 65/1093; H04L 65/403; G06F 40/40; G10L 15/22; G10L 15/26; G10L 2015/223
See application file for complete search history.

(56) References Cited

U.S. PATENT DOCUMENTS

| 7,827,047 B2 | 11/2010 | Anderson et al. |
| 10,459,985 B2 | 10/2019 | Shepherd et al. |

(Continued)

FOREIGN PATENT DOCUMENTS

| CN | 104951927 | 9/2015 |
| CN | 106528059 A | 3/2017 |

(Continued)

OTHER PUBLICATIONS

Brenda K. Deskin "The Benefits of Using a Visual Timer For Children With Special Needs—Friendship Circle—Special Needs Blog" (online) retrieved from the Internet on Oct. 27, 2020 at URL>https://www.friendshipcircle.org/blog/2013/01/28/the-benefits-of-using-a . . . , Total 3 pages.

(Continued)

*Primary Examiner* — Oleg Survillo
(74) *Attorney, Agent, or Firm* — Konrad, Raynes, Davda & Victor LLP; David W. Victor (57) ABSTRACT

Provided are a computer program product, system, and method for setting timers based on processing of communications using natural language processing. A communication is detected from a communicating participant transmitted within a group communication session implemented in a computer network in which the communicating participant is communicating with an additional participant through the group communication session. A natural language processor (NLP) module processes the detected communication to determine words comprising an expressed temporal commitment of the communicating participant. The expressed temporal commitment does not express a computer implemented command verb to perform an operation related to setting a time variable. A timer is set, in a computer user interface of the additional participant, to a time value based (Continued)

on the expressed temporal commitment in the detected communication.

20 Claims, 6 Drawing Sheets (51) Int. Cl.
*G10L 15/22* (2006.01)
*H04L 65/403* (2022.01)
*G06F 40/40* (2020.01)
*G10L 15/26* (2006.01)

(52) U.S. Cl.
CPC ............ *G10L 15/26* (2013.01); *H04L 65/403* (2013.01); *G10L 2015/223* (2013.01)

(56) References Cited

U.S. PATENT DOCUMENTS

| | | | |
|---|---|---|---|
| 10,460,215 B2* | 10/2019 | Herold | A61B 5/0205 |
| 2014/0297287 A1 | 10/2014 | Newman | |
| 2016/0063505 A1 | 3/2016 | Bradley | |
| 2017/0249956 A1* | 8/2017 | Dey | G06F 40/295 |
| 2019/0279624 A1 | 9/2019 | Boss et al. | |
| 2021/0406460 A1* | 12/2021 | Chen | G06F 40/205 |
| 2022/0084667 A1* | 3/2022 | Tan | G10L 15/22 |

FOREIGN PATENT DOCUMENTS

| | | |
|---|---|---|
| CN | 106681131 A | 5/2017 |
| CN | 108490757 A | 9/2018 |
| KR | 102050244 B1 | 11/2019 |
| KR | 102076212 B1 | 2/2020 |

OTHER PUBLICATIONS

Kasper Nymand, "Why Time Tracking is Important for You & Your Organization", (online) retrieved from the Internet on Oct. 27, 2020 at URL>https://www.forecast.app/blog/why-time-tracking-is-important-for-you-and-your-...1, Total 9 pages.

Thomas Oppong, "People Who Value Time More Than Money Are Happier and More Productive", dated Feb. 20, 2019, (online) retrieved from the Internet at URL>https://medium.com/kaizen-habits/people-who-value-time-more-than-m . . . , Total 7 pages.

* cited by examiner

SETTING TIMERS BASED ON PROCESSING OF GROUP COMMUNICATIONS USING NATURAL LANGUAGE PROCESSING

BACKGROUND OF THE INVENTION

1. Field of the Invention

The present invention relates to a computer program product, system, and method for setting timers based on processing of communications using natural language processing.

2. Description of the Related Art

Time management is one of the most important aspects of modern life, especially as people have to multi-task with different activities. Many people spend significant amounts of time in on-line group communication and social collaboration networks communicating with friends, family and work colleagues. Timers used in online group communication networks include timers that track duration of a meeting and provide alerts to users before the meeting, when the meeting commences, and time limits, such as warning participants that the free session has reached its maximum duration. Keeping track of time involvement in online group communication sessions while multi-tasking is an increasing challenge in todays interconnected world.

There is a need in the art for improved techniques for tracking and managing time in on-line group communication networks.

SUMMARY

Provided are a computer program product, system, and method for setting timers based on processing of communications using natural language processing. A communication is detected from a communicating participant transmitted within a group communication session implemented in a computer network in which the communicating participant is communicating with an additional participant through the group communication session. A natural language processor (NLP) module processes the detected communication to determine words comprising an expressed temporal commitment of the communicating participant. The expressed temporal commitment does not express a computer implemented command verb to perform an operation related to setting a time variable. A timer is set, in a computer user interface of the additional participant, to a time value based on the expressed temporal commitment in the detected communication.

DETAILED DESCRIPTION

Oftentimes when people are involved in an online group communication session over a computer network, a participant in the session may have to momentarily leave to address another time commitment, such as another matter or for a break. Currently, when a participant in a group communication session steps away, there is no way for the other participants in the meeting and the absent participant to accurately track the absence of the participant. A group communication session may involve a social collaboration effort, such as between friends, family, co-workers, adversaries, etc., to achieve a common goal, such as negotiations, event planning, project development, dispute resolution, facilitate cooperation, etc.

Described embodiments provide improvements to computer technology for time management in a group communication session over an on-line network by monitoring a participant's communications in the group communication session. Communications are converted to text, if not already in text, and processed by a natural language processor (NLP) to determine whether the participant expresses time commitments indicating the participant departing momentarily from the group communication session. A timer manager program may maintain associations of expressed time commitments, expressed relative time words the NLP identifies in a communication, and the context and attributes of the group communication session with a time value of an expected duration during which the participant is expected to be away. This association can then be used to determine time values based on the associated factors present in the system including expressed time commitment, expressed relative time words, and attributes of the group communication session. A timer may then be set based on the associated time value. This timer may then be propagated over the network to all the participants to observe in their computer user interfaces to keep track of the expected time when the participant will return and to allow the absent participant to track the time they are away from the meeting so they can return at a time expected by the other participants. This allows all participants to manage time effectively when another participant momentarily departs from the session.

Figure 1:
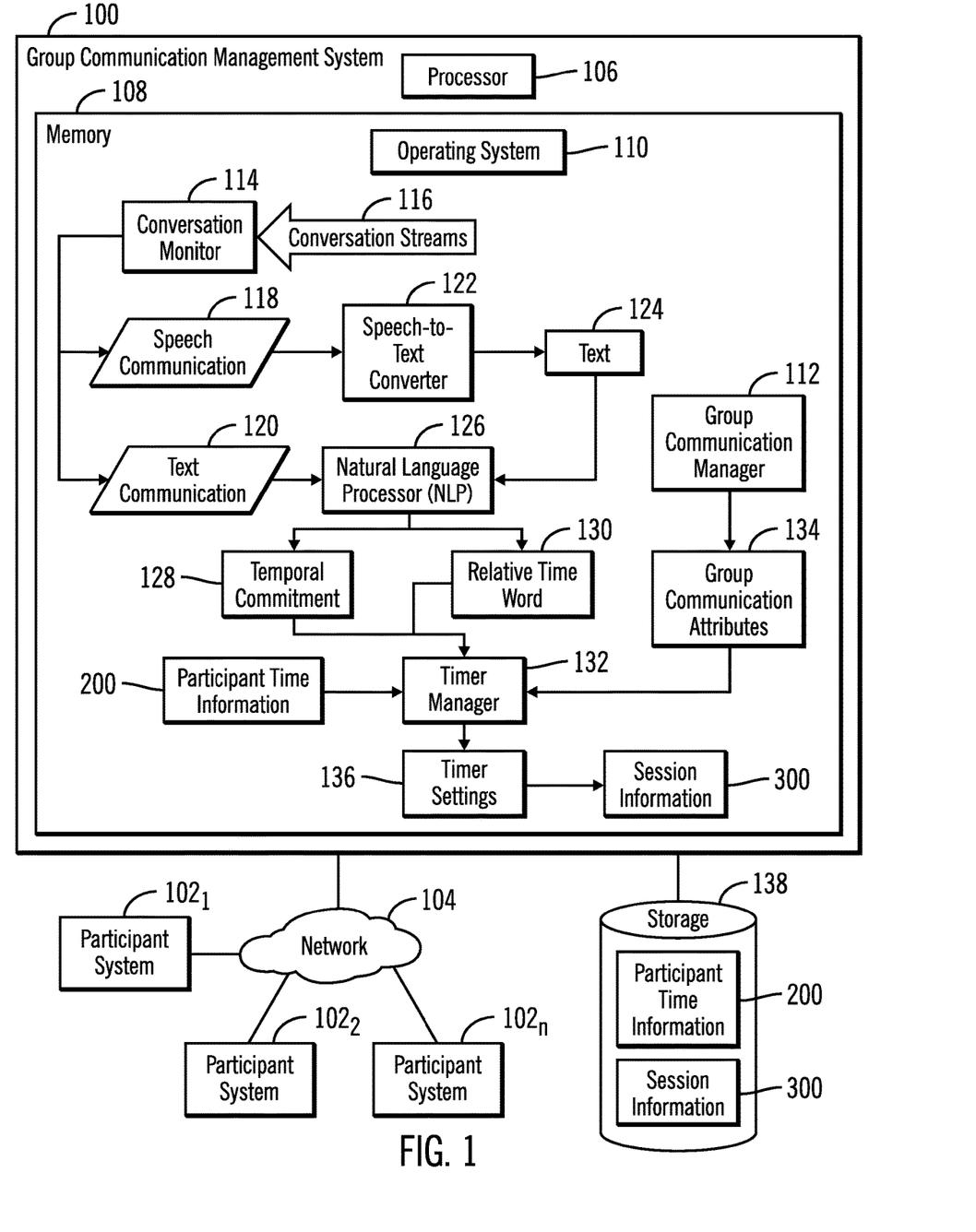
FIG. 1 illustrates an embodiment of an on-line group communication network environment.

FIG. 1 illustrates an embodiment of a social collaborative network environment in which embodiments are implemented. A social collaborative management system 100 maintains group communication sessions among participant computer systems $102_1 \ldots 102_n$ over a network 104, where two or more participants are involved in a social collaborative session, such as a video conference call, group text messaging system, etc.

The social collaborative management system 100 includes a processor 106 and a main memory 108. The main memory 108 includes various program components including an operating system 110 to manage system operations in the system 100; a group communication manager 112 to manage group communication sessions in which participants at computer devices $102_1 \ldots 102_n$ communicate over the network 104, such as in a web conference service, texting collaboration environment, etc.; a conversation monitor 114 to receive conversation streams 116 from the devices $102_1 \ldots 102_n$ of participants in group communication sessions over the network 104, which may include speech communication 118 and text communication 120 occurring in the group communication session; a speech-to-text converter 122 to convert digital speech communication 118 from a participant in a group communication session to text 124, such as by way of example the Watson™ Speech to Text program, that converts audio and voice into written text; a natural language processor (NLP) 126 program, such as by way of example, the Watson™ Natural Language Understanding program, that processes received text communication 120 or the converted text 124, to determine whether the text 120, 124 includes a temporal commitment 128 statement from the participant and a relative time word 130 concerning a duration of the temporal commitment 128; and a timer manager 132 to receive as input the determined temporal commitment 128 and relative time word 130 for the temporal commitment 128, group communication attributes 134 on the group communication session managed by the group communication manager 112, and participant time information 200 to produce timer settings 136 indicating a timer counting the expected duration of the temporal commitment 128 the participant is expected to be away from the group communication session. Session information 300 for the group communication session is updated with the new timer settings 136.

The timer 136 may increment to a time value, decrement to zero or be an elapse timer. Further, the timer settings 136 may indicate a type of notification, such as a reminder, an alarm, etc. when the timer expires.

The group communication management system 100 may store the participant time information 200 and the session information 300 in persistent storage 138.

In one embodiment, the conversation streams 116 (text or speech) from the participants at their systems $102_1 \ldots 102_n$ within a social collaborative session may be continually tracked by the conversation monitor 114, with the permission of the participant, and processed by the NLP 126 to determine whether there is an expression of a temporal commitment 128 to leave the group communication session and return within a time frame. In certain embodiments, the statement of a time related commitment is not a computer command verb to create a time related event, such as to start a timer or schedule an event. Instead, the statement of temporal commitment concerns the speaker's intention for their own actions for a momentary leave from the session, as opposed to a statement to instruct a computer to perform a time related action. For instance, the statement comprising the temporal commitment 128 may include statements such as "I need to step away for a few minutes", "I need to get something to drink, be back in five", "I need to take this quick call", etc. These are all statements expressing that the participant needs to engage in another activity for a brief period, i.e., temporal commitment 128, and will return to the social collaborative session after completing the activity, within a time expressed by the relative time word 130.

The NLP 126 may further determine relative time words 130 within a proximate word distance from the temporal commitment 128 expression such that the relative time words 130 are likely intended to qualify the duration of the temporal commitment 128.

To determine whether statements in the text comprise temporal commitments 128 and relative time words 130, the NLP 126 may capture a cosine distance of words in the text to determine their cosine distance or cosine similarity to known temporal commitment and relative time expressions in a dictionary or ontology of time expressions to determine whether the cosine similarity satisfies a confidence level indicating a temporal commitment 128 and relative time word 130.

The NLP 126 may utilize deep learning algorithms and be trained to recognize expressions of temporal commitments 128 and relative time words 130.

Figure 2:
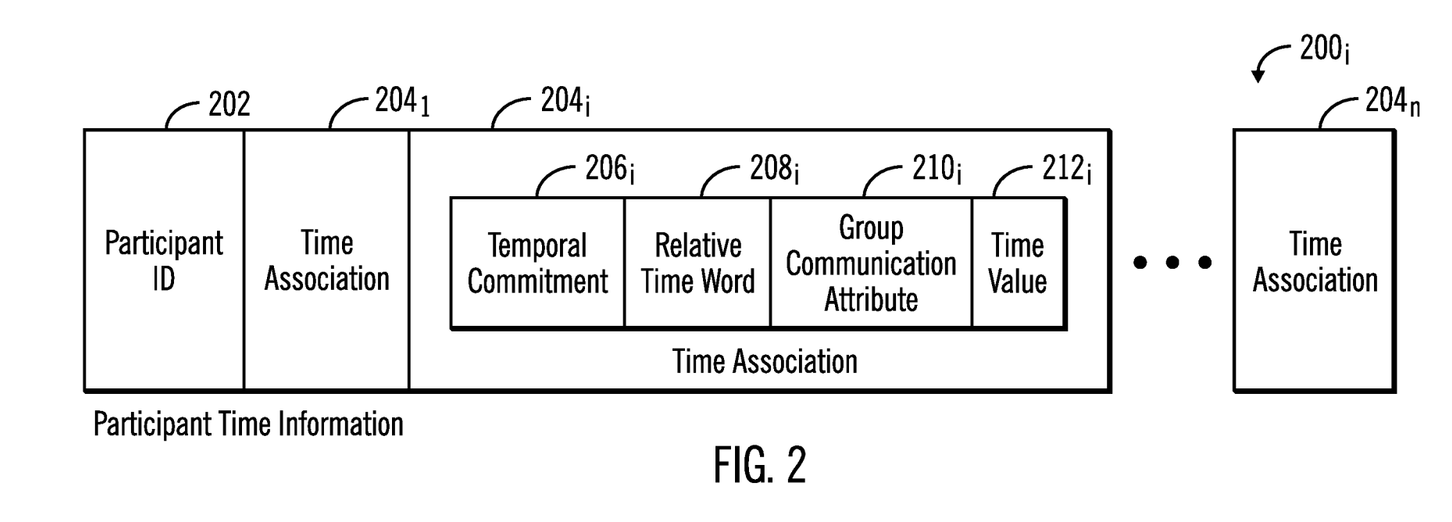
FIG. 2 illustrates an embodiment of participant time information.
Figure 3:
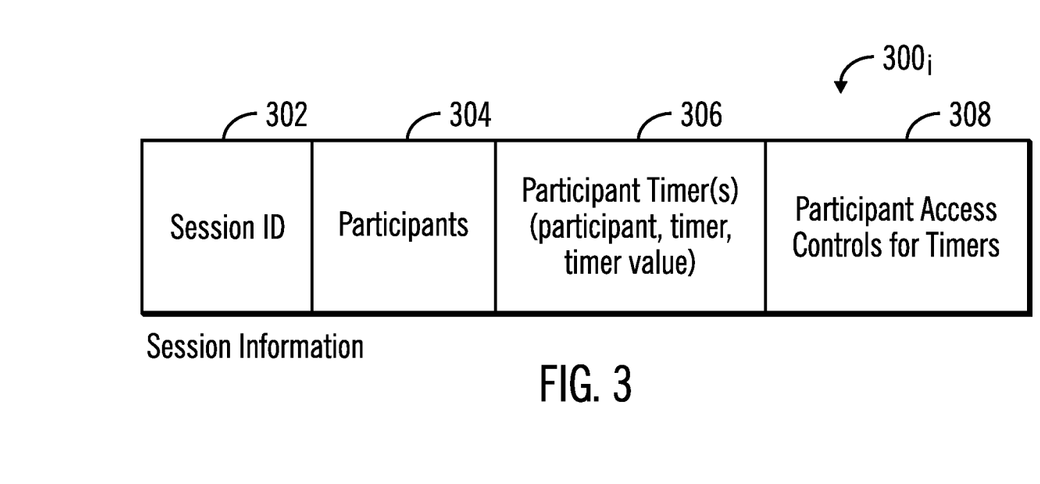
FIG. 3 illustrates an embodiment of session information for a group communication session.

The participant time information 200 and the session information 300 may be implemented in database objects or tables, tables, and other data structures, and stored in a persistent storage 138.

The participant systems $102_1, 102_2 \ldots 102_n$ may comprise laptop or desktop computers, smartphone, tablet computer, wearable computer, wrist-watch computer, computer glasses, etc.

The group communication management system 100 may be implemented in numerous server systems and the programs and functions described in the memory 108 may be implemented in multiple server computers comprising a group communication management system 100 to provide multiple group communication sessions to numerous participants.

The network 104 may comprise a Storage Area Network (SAN), Local Area Network (LAN), Intranet, the Internet, Wide Area Network (WAN), peer-to-peer network, wireless network, arbitrated loop network, etc.

The memory 108 may comprise suitable volatile or non-volatile memory devices.

The storage 138 may comprise a non-volatile storage device, such as one or more of a solid state drive (SSD), hard disk drive, and other types of storage devices, which may further be configured from an array of devices, such as Just a Bunch of Disks (JBOD), Direct Access Storage Device (DASD), Redundant Array of Independent Disks (RAID) array, virtualization device, etc.

Generally, program modules, such as the program components 110, 112, 114, 122, 126, 132 may comprise routines, programs, objects, components, logic, data structures, and so on that perform particular tasks or implement particular abstract data types. The program components and hardware devices of the group communication management system 100 may be implemented in one or more computer systems, where if they are implemented in multiple computer systems, then the computer systems may communicate over a network.

The program components 110, 112, 114, 122, 126, 132 may be accessed by the processor 106 from the memory 108 to execute. Alternatively, some or all of the program components 112, 114, 122, 126, 132 may be implemented in separate hardware devices, such as Application Specific Integrated Circuit (ASIC) hardware devices.

The functions described as performed by the program components 110, 112, 114, 122, 126, 132 may be implemented as program code in fewer program modules than shown or implemented as program code throughout a greater number of program modules than shown.

Certain of the components, such as the natural language processor 126 may use machine learning and deep learning algorithms to classify the text 120, 124 into temporal commitments 128 and relative time words 130. In one embodiment, the natural language processor 126 may comprise machine learning modules, such as artificial neural network programs. A neural network may be trained using backward propagation to adjust weights and biases at nodes in a hidden layer to produce a desired/correct categorization or outcome given the input. For instance, the natural language processor 126 may be trained to categorize text into temporal commitments and relative time words in a lexicon, ontology or dictionary of such time related terms.

In the described embodiments, the conversation monitor 114, speech-to-text convertor 122, NLP 126, and time manager 132 are shown in FIG. 1 as included in the group communication management system 100. In alternative embodiments, some or all of the operations described with respect to the conversation monitor 114, speech-to-text convertor 122, NLP 126, and time manager 132 may be performed by executed program modules at the participant systems $102_1, 102_2 \ldots 102_n$.

The arrows shown in FIG. 1 between the components 114, 122, 126, and 132 represent a data flow between the components.

FIG. 2 illustrates an embodiment of an instance of participant time information $200_i$ for a participant i in a group communication session in the participant time profile information 200 having information including: a participant identifier (ID) 202 and one or more instances of time associations $204_1, 204_2 \ldots 204_n$. Each time association $204_i$ may include a temporal commitment $206_i$ for a temporal commitment 128 identified in the text 120 or 124, a relative time word $208_i$ for a relative time word 130 identified in the text 120 or 124 providing an expected duration of the temporal commitment 206i, a group communication attribute $210_i$ of the group communication session including the participant 202, and a measured time value $212_i$ of a time duration associated with the tuple temporal commitment 206i, relative time word $208_i$, and group communication attribute $210_i$. The measured time value $212_i$ may comprise the measured time during which the participant was away from the group communication session for the temporal commitment $206_i$.

In certain instances, the time associations $204_i$ may include the temporal commitment $206_i$ and no further values $208_i, 210_i$ or one or both of the values $208_i, 210_i$, and any additional related values decided to include in the association $206_i$.

With the embodiment of FIG. 2, each participant may have user specific measured time values 212i for previously occurring different combinations of temporal commitment 206i, relative time word $208_i$, and group communication attributes $210_i$ The time value $212_i$ may comprise a measured duration or time during which the participant was away from the group communication session for the identified temporal commitment 206i described by the participant as having a relative time word $208_i$ identifying a duration for the commitment 206i, and group communication attributes $210_i$ present when the temporal commitment 206i was expressed. Group communication attributes $210_i$ may comprise, without limitation, a nature or description of the group communication session, time of the session, number of participants, identity of key participants, etc. The time value $212_i$ may comprise an aggregate, e.g., average, of time values $212_i$ measured for the tuple temporal commitment 206i, relative time word $208_i$, and group communication attribute $210_i$.

FIG. 3 illustrates an embodiment of session information $300_i$ for one session i in the session information 300 having a session identifier (ID) 302; participants 304 in the session 302; participant timers 306 set for the participants 304, that are set when a participant 304 temporarily leaves a group communication session 302 for a detected temporal commitment. The timer information 306 may include information on the set timer 306, including a timer identifier and timer value. The session information $300_i$ may further include participant access controls for timers 308 indicating access level permissions to allow participants to change timers 306 set for other timers.

With the embodiment of FIG. 3, the session information $300_i$ for a session i may include multiple timers 306 for multiple participants that have temporarily left the session. The multiple timers 306 may be displayed in all the participant user interfaces to see when different participants are expected to return to the group communication session 302. Access control information for timers 308 indicates which participants can modify or edit other participant timers 306.

Figure 4:
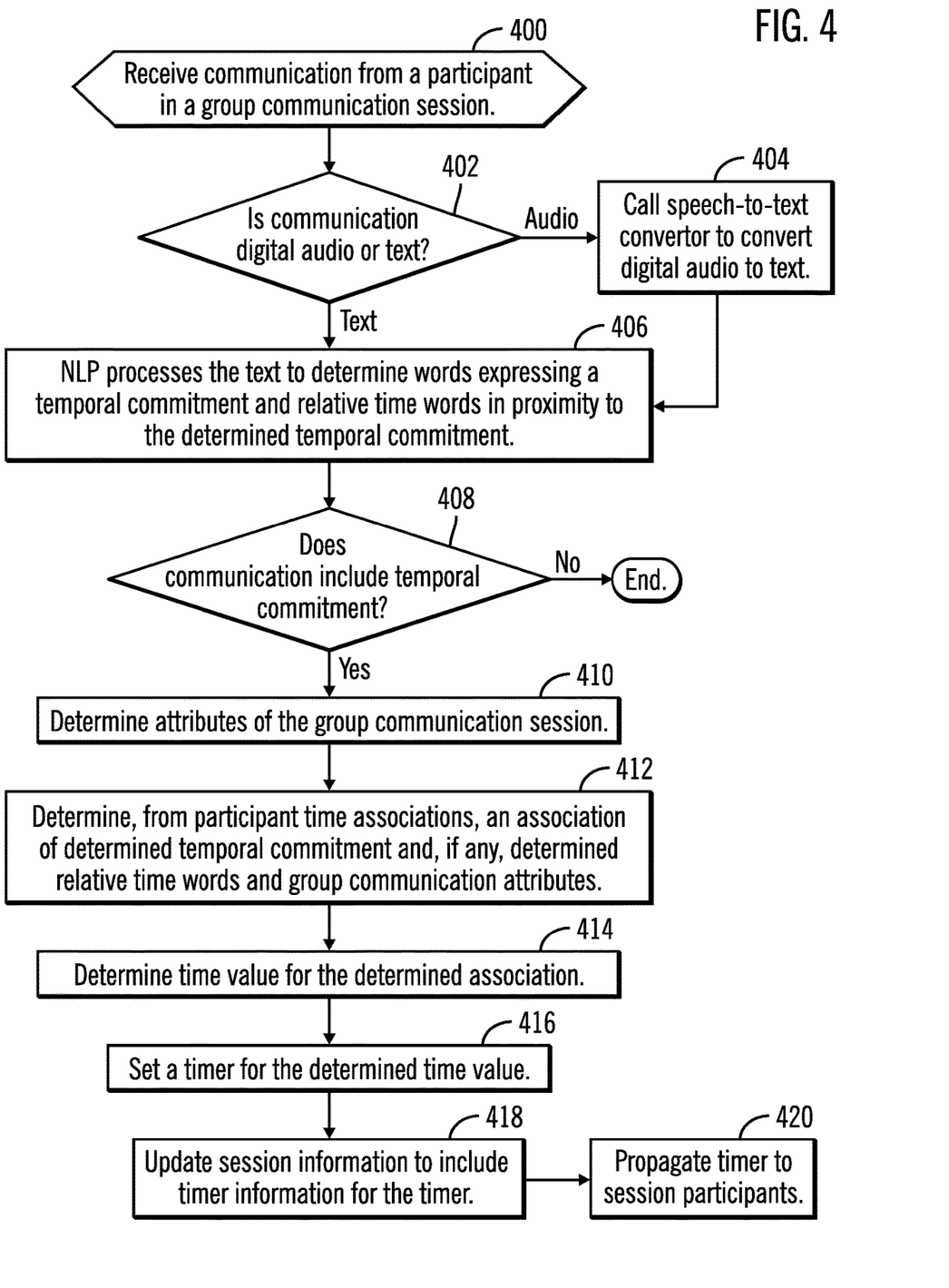
FIG. 4 illustrates an embodiment of operations to process communications from a participant in a group communication session.

FIG. 4 illustrates an embodiment of operations performed by components including the conversation monitor 114, speech-to-text converter 122, NLP 126, and timer manager 136 to create timers for expressed time commitments, not comprising verbal computer commands to set a timer. Upon the conversation monitor 114 receiving (at block 400) a conversation stream 116 from a participant in a group communication session $300_i$, if (at block 402) the conversation 116 is digital audio, then the speech-to-text converter 122 is called to convert speech communication 118 to text 124. If (at block 402) the conversation 116 is text 120 or after speech is converted to text 124, the NLP 126 processes the text 120, 124 to determine (at block 408) words expressing a temporal commitment 128 and relative time words 130 in proximity to the determined expressed temporal commitment 128. Certain text 120, 124 may include a temporal commitment 128 without expressed relative time words. If (at block 408) there are no expressed temporal commitments 128 and relative time words 130, then control end. If (at block 408) there is an expressed temporal commitment 128 and relative time words 130, then the timer manager 132 determines (at block 410) attributes of the group communication session $300_i$, e.g., number of participants, identity of participants, nature of meeting, etc.

The timer manager 132 determines (at block 412) from participant i time associations $204_1, 204_1 \ldots 204_1$ whether there is an association $206_i$ having a temporal commitment $206_i$, the relative time word $208_i$, and the group communication attribute $210_i$ matching the expressed temporal commitment 128 and any determined attributes of 134 group communication session $300_i$ and expressed relative time words 130 in the text 120. A time value $212_i$ is determined (at block 414) from the determined time association $204_i$ and a timer 136 is set (at block 416) having the determined time value $212_i$. The session information $300_i$ is updated (at block 418) to include timer information for the set timer in a participant timer 306. The set timer 136 is then propagated (at block 420) to the user interfaces of participant systems $102_1 \ldots 102_n$ to display so that the other participants in the group communication session $300_i$ can observe the timer indicating when the participant is expected to return to the session.

With the embodiment of FIG. 4, a participant in a group communication session that has to leave the session for some expressed duration will cause a determination from that communication, via speech or text, of an expressed temporal commitment 128 and relative time words 130 that may then be used to set a timer to a time value $212_i$ associated with the expressed temporal commitment 128, expressed time words 130 and any attributes 134 of the group communication session. This allows participants in a group communication session to track when another participant will return to a session to continue participation and allow the participant expressing the time commitment to also monitor how long they have been absent from the session to ensure they return in the expected time. Described embodiments provide improved technology for enhancing time awareness when participants in a group communication session recess for a time.

In certain instances, the time value $212_i$ indicated in the association $204_i$ may differ from the duration implied by the relative time word $208_i$ expressed by the participant, because the measured duration may differ from what the participant expressed for the duration of their absence. For instance, some participants may consistently underestimate or overestimate the relative time of their time commitment. By setting the timer 136 to the time value $212_i$ associated with the expressed temporal commitment 128 and relative time words 130 that differs from the expressed relative time, the participant may then realize they usually do not meet their expressed absence duration and become more cognizant of the time they spend during a break.

Figure 5:
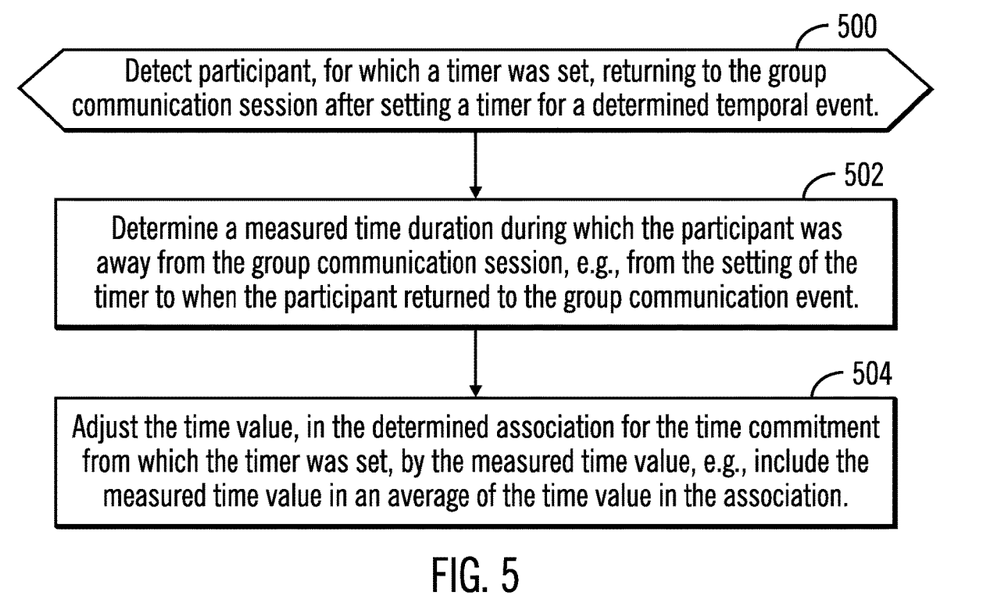
FIG. 5 illustrates an embodiment of operations to adjust participant time information when participant returns to the group communication session after a time related event.

FIG. 5 illustrates an embodiment of operations performed by the timer manager 132 or other component upon detecting that a participant has returned to the group communication session after completing their time commitment, as represented by a timer 136. The participant may return to the group communication session before or after the timer 136 expires. The participant's return to the group communication session $300_i$ may be detected by the participant interacting with a user interface for the group communication session, such as via a keyboard, mouse, voice controls, touch screen, etc., or the user speaking or communicating through the group communication session. Upon detecting (at block 500) that a participant has returned to the group communication session, the timer manager 132 determines (at block 502) a duration during which the participant was absent from the group communication session. This duration may be calculated from the time the timer 136 is set to when the participant is detected as having returned to the group communication session. The time value $212_i$ in the determined association $204_i$ (at block 412 in FIG. 4) for the time commitment from which the timer 136 was set is adjusted (at block 504) by the measured duration. The adjustment may comprise including the measured time duration in an average or other aggregate of the time values used to calculate the time value $212_i$ in the association $204_i$ for the returning participant.

With the operations of FIG. 5, the time value, in an association $204_i$ of time commitments, relative time words, and attributes of group communications, that is used to set the timer 136 is updated to reflect the actual measured duration during which the user was away from the group communication session to provide a more accurate time value $212_i$ for the association of at least one of an expressed temporal commitment, relative time words, and attributes of the group communication session. This provides a time value to use that is based on actual experienced time durations of user absence for the expressed time commitment, relative time words, and attributes of the group communication session. Thus, a specific time value $212_i$ can be provided based on experience when the user expresses relative time words such as "I'll be back in a few" or "I'll be back shortly".

Figure 6:
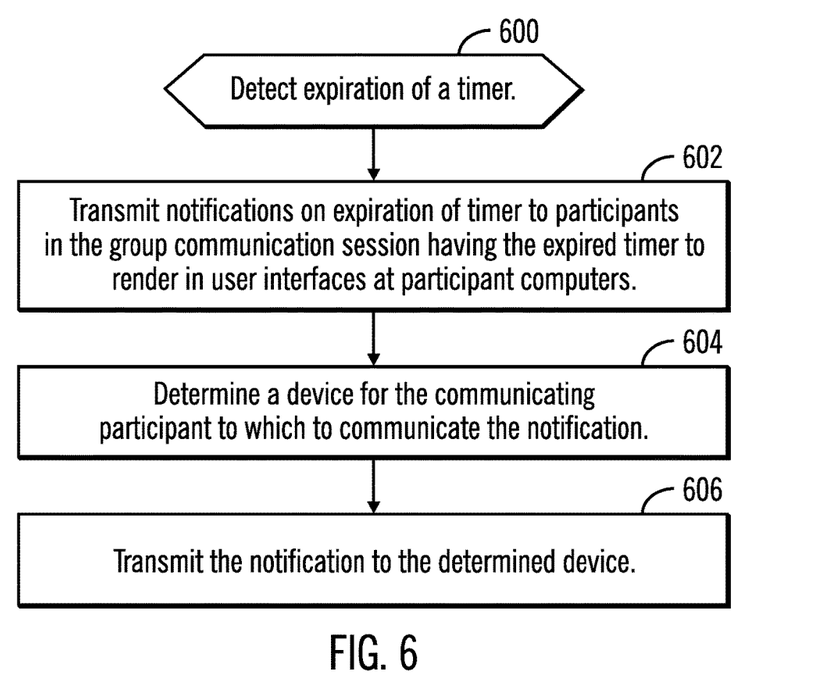
FIG. 6 illustrates an embodiment of operations upon expiration of a timer.

FIG. 6 illustrates an embodiment of operations performed by the timer manager 132 to process an expiration of a timer 306 for a group communication session $300_i$. Upon detecting (at block 600) expiration of a timer 306, the timer manager 132 transmits (at block 602) notifications on expiration of the timer 306 to the participants in the group communication session 300, having the expired timer 306 to render in participant user interfaces at participant computers $102_1 \ldots 102_n$. The timer manager 132 further determines (at block 604) a device for the communicating participant for which the timer 306 was generated and transmits (at block 606) the notification to that additional device for the communicating participant. Additional devices may be able to reach the user while away, such as a smartwatch or the Internet of Things to render the notification on a device in proximity to the participant while away from the session.

With the embodiment of FIG. 6, the participant for which the timer was started may provide information on another device to which to communicate while they are away from the group communication session, such as a cell phone number, smart watch or other portable mobile communication device. This allows the participant to be alerted that the expected time to be away from the group communication session has expired and that they should soon return to the session as expected by the other participants from the expired timer.

Figure 7:
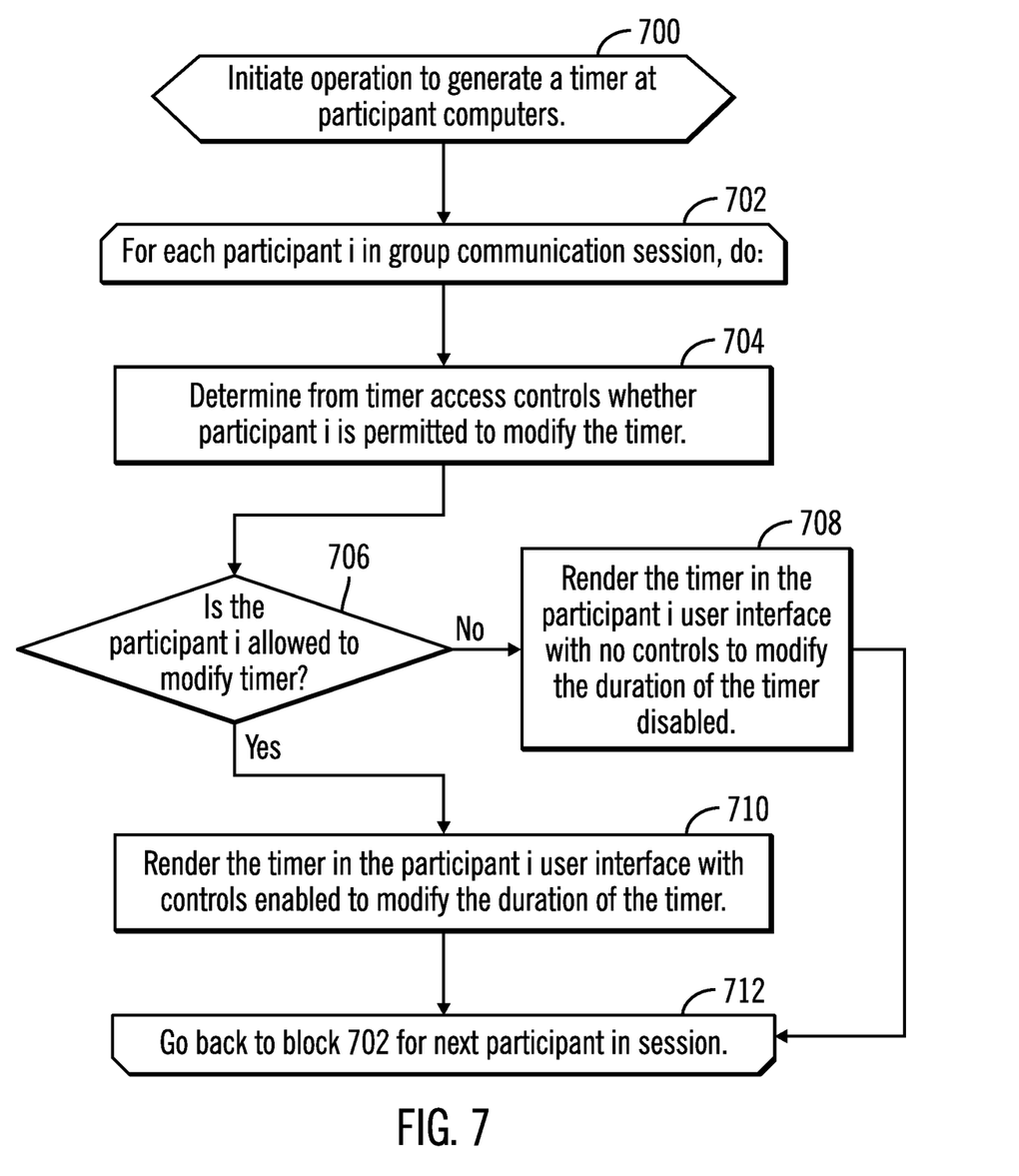
FIG. 7 illustrates an embodiment of operations to generate timers at participant computers.

FIG. 7 illustrates an embodiment of operations performed by the timer manager 132 to generate a timer rendered in the user interfaces at participant computers $102_1 \ldots 102_n$. Upon initiating (at block 700) operation to generate a timer 136 to render at the participant computers $102_1 \ldots 102_n$, the timer manager 132 performs the operations from block 702 through 712 for each participant i in a group communication session $300_i$. The timer manager 132 determines (at block 704) from access timer controls 308 whether participant i is permitted to modify the timer 136. If (at block 706) the participant i is not allowed to modify the timer 136, then the timer manager 132 renders (at block 708) the timer in the participant i user interface with no controls to modify the duration of the timer 136. If (at block 708) the participant i is allowed to modify the timer 136, then the timer manager 132 renders (at block 710) the timer in the participant i user interface with controls to modify the duration of the timer 136.

With the embodiment of FIG. 7, timers are rendered that allow other participants to modify the timer if they believe the participant communicating the time commitment will take longer or be back sooner to the group communication session than the remaining time left on the timer. Further, if multiple participants are away from the session, then multiple timers for the different absent participants may be rendered in the user interfaces of participants to track all who are absent.

In further embodiments, feedback can be provided when the timer is set to adjust the timer if the participant believes the time value $212_i$ is not accurate. Further, if the group communication session is terminated while the user is absent and the timer has not expired, then the timer manager 132 can notify the absent participant that the session has ended and the do not need to rush back to reconnect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
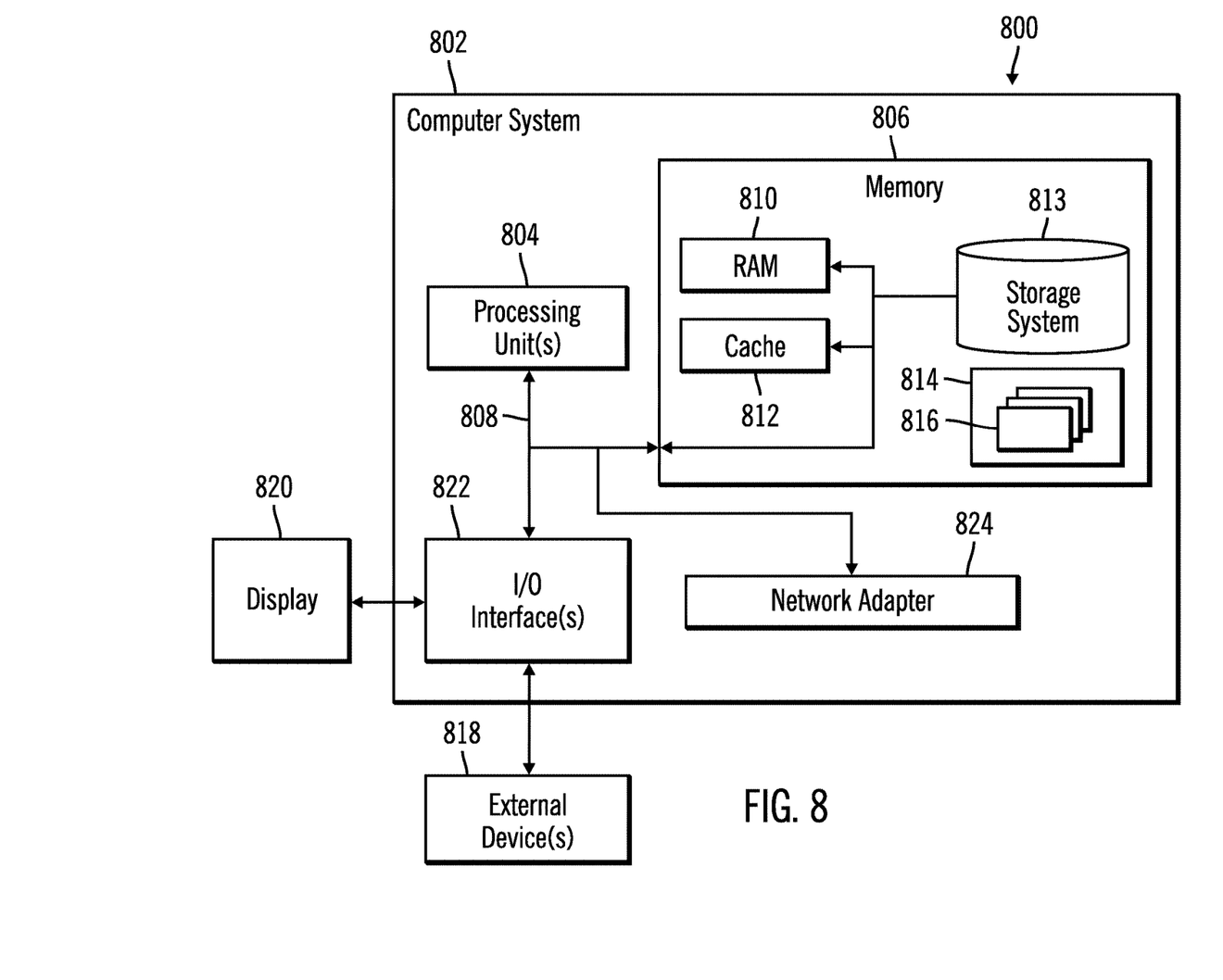
FIG. 8 illustrates a computing environment in which the components of FIG. 1 may be implemented.

The computational components of FIG. 1, including the group communication management system 100, client systems 102$_1$, 102$_2$ . . . 102$_n$, and storage 138 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The letter designators, such as i, j are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method computer program product for providing timing information to participants in a group communication session implemented in a computer network, wherein the computer program product comprises a computer readable storage medium having program instructions embodied therewith that when executed cause operations, the operations comprising:

detecting communication from a communicating participant transmitted within the group communication session in which the communicating participant is communicating with an additional participant through the group communication session;

processing, using a natural language processor (NLP) module, the detected communication to determine words comprising an expressed temporal commitment of the communicating participant, wherein the expressed temporal commitment does not express a computer implemented command verb to perform an operation related to setting a time variable; and setting, in a computer user interface of the additional participant, a timer to a time value based on the expressed temporal commitment in the detected communication.

2. The method of claim 1, further comprising:

maintaining, for each participant of a plurality of participants in the group communication session, associations of temporal commitments and time values;

determining, for the communicating participant, an association of a temporal commitment comprising the expressed temporal commitment; and determining, from the determined association, a time value associated with the expressed temporal commitment, wherein the timer is set to the determined time value.

3. The method of claim 2, further comprising:

determining a measured duration of the expressed temporal commitment; and adjusting the time value, in the determined association with the expressed temporal commitment, based on the measured duration.

4. The method of claim 2, further comprising:

determining, by the NLP module, an expressed relative time word in proximity to the expressed temporal commitment, wherein the associations further associate a relative time word with the temporal commitment and time value, and wherein the determining the association comprises determining an association of a temporal commitment and relative time word comprising the expressed temporal commitment and expressed relative time word, respectively.

5. The method of claim 1, further comprising:

maintaining, for each participant of a plurality of participants in the group communication session, associations of time values with at least one of temporal commitments, group communication session attributes, and relative time words;

determining attributes of the group communication session;

determining, by the NLP module, an expressed relative time word in proximity to the expressed temporal commitment;

determining, for the communicating participant, an association of a temporal commitment comprising the expressed temporal commitment, relative time words comprising the expressed relative time word, and group communication session attributes comprising the determined attributes; and determining, from the determined association, a time value associated with the expressed temporal commitment and the determined attributes, wherein the timer is set to the determined time value.

6. A computer program product for providing timing information to participants in a group communication session implemented in a computer network, wherein the computer program product comprises a computer readable storage medium having program instructions embodied therewith that when executed cause operations, the operations comprising:

detecting communication from a communicating participant transmitted within the group communication session in which the communicating participant is communicating with an additional participant in the group communication session;

processing, using a natural language processor (NLP) module, the detected communication to determine words comprising an expressed temporal commitment of the communicating participant, wherein the expressed temporal commitment does not express a computer implemented command verb to perform an operation related to setting a time variable; and setting, in a computer user interface of the additional participant, a timer to a time value based on the expressed temporal commitment in the detected communication.

7. The computer program product of claim 1, wherein the detected communication comprises speech, wherein the operations further comprise:

converting the speech to text as the communicating participant is speaking within the group communication session, wherein the processing the detected communication comprises the NLP module processing the text.

8. The computer program product of claim 1, wherein the operations further comprise:

maintaining, for each participant of a plurality of participants in the group communication session, associations of temporal commitments and time values;

determining, for the communicating participant, an association of a temporal commitment comprising the expressed temporal commitment; and determining, from the determined association, a time value associated with the expressed temporal commitment, wherein the timer is set to the determined time value.

9. The computer program product of claim 8, wherein the operations further comprise:

determining a measured duration of the expressed temporal commitment; and adjusting the time value, in the determined association with the expressed temporal commitment, based on the measured duration.

10. The computer program product of claim 8, wherein the operations further comprise:

determining, by the NLP module, an expressed relative time word in proximity to the expressed temporal commitment, wherein the associations further associate a relative time word with the temporal commitment and time value, and wherein the determining the association comprises determining an association of a temporal commitment and relative time word comprising the expressed temporal commitment and expressed relative time word, respectively.

11. The computer program product of claim 10, wherein the expressed relative time word indicates a time value that differs from the determined time value indicated in the determined association for the expressed temporal commitment and the expressed relative time word.

12. The computer program product of claim 1, wherein the operations further comprise:

maintaining, for each participant of a plurality of participants in the group communication session, associations of temporal commitments, group communication session attributes, and time values;
determining attributes of the group communication session;
determining, for the communicating participant, an association of a temporal commitment comprising the expressed temporal commitment and group communication session attributes comprising the determined attributes; and
determining, from the determined association, a time value associated with the expressed temporal commitment and the determined attributes, wherein the timer is set to the determined time value.

13. The computer program product of claim 1, wherein the timer expires when the time value set for the timer has elapsed, wherein the operations further comprise:
generating a notification to a first user interface of the communicating participant and a second user interface of the additional participant that the timer expired in response to the timer expiring.

14. The computer program product of claim 1, wherein the operations further comprise:
maintaining, for each participant of a plurality of participants in the group communication session, associations of time values with at least one of temporal commitments, group communication session attributes, and relative time words;
determining attributes of the group communication session;
determining, by the NLP module, an expressed relative time word in proximity to the expressed temporal commitment;
determining, for the communicating participant, an association of a temporal commitment comprising the expressed temporal commitment, relative time words comprising the expressed relative time word, and group communication session attributes comprising the determined attributes; and
determining, from the determined association, a time value associated with the expressed temporal commitment and the determined attributes, wherein the timer is set to the determined time value.

15. The computer program product of claim 1, wherein the operations further comprise:
render the timer in the additional participant computer user interface with controls enabling the additional participant to modify a duration of the timer in response to access controls for the communicating participant indicating that the additional participant is permitted to modify the timer.

16. A system for providing timing information to participants in a group communication session implemented in a computer network, comprising:
a processor; and
a computer readable storage medium having program instructions embodied therewith that when executed by the processor causes operations, the operations comprising:
detecting communication from a communicating participant transmitted within the group communication session in which the communicating participant is communicating with an additional participant through the group communication session;
processing, using a natural language processor (NLP) module, the detected communication to determine words comprising an expressed temporal commitment of the communicating participant, wherein the expressed temporal commitment does not express a computer implemented command verb to perform an operation related to setting a time variable; and
setting, in a computer user interface of the additional participant, a timer to a time value based on the expressed temporal commitment in the detected communication.

17. The system of claim 16, wherein the operations further comprise:
maintaining, for each participant of a plurality of participants in the group communication session, associations of temporal commitments and time values;
determining, for the communicating participant, an association of a temporal commitment comprising the expressed temporal commitment; and
determining, from the determined association, a time value associated with the expressed temporal commitment, wherein the timer is set to the determined time value.

18. The system of claim 17, wherein the operations further comprise:
determining a measured duration of the expressed temporal commitment; and
adjusting the time value, in the determined association with the expressed temporal commitment, based on the measured duration.

19. The system of claim 18, wherein the operations further comprise:
determining, by the NLP module, an expressed relative time word in proximity to the expressed temporal commitment, wherein the associations further associate a relative time word with the temporal commitment and time value, and wherein the determining the association comprises determining an association of a temporal commitment and relative time word comprising the expressed temporal commitment and expressed relative time word, respectively.

20. The system of claim 16, wherein the operations further comprise:
maintaining, for each participant of a plurality of participants in the group communication session, associations of time values with at least one of temporal commitments, group communication session attributes, and relative time words;
determining attributes of the group communication session;
determining, by the NLP module, an expressed relative time word in proximity to the expressed temporal commitment;
determining, for the communicating participant, an association of a temporal commitment comprising the expressed temporal commitment, relative time words comprising the expressed relative time word, and group communication session attributes comprising the determined attributes; and
determining, from the determined association, a time value associated with the expressed temporal commitment and the determined attributes, wherein the timer is set to the determined time value.

* * * * *